United States Patent [19]

Fallon et al.

[11] Patent Number: 5,783,827
[45] Date of Patent: Jul. 21, 1998

[54] SCANNING EARTH HORIZON SENSOR

[75] Inventors: James J. Fallon, Bronxville, N.Y.; Gerald Falbel, Stamford; Richard W. Rhyins, Ridgefield, both of Conn.

[73] Assignee: Ithaco Space Systems, Inc., Ithaca, N.Y.

[21] Appl. No.: 714,985

[22] Filed: Sep. 13, 1996

[51] Int. Cl.$^6$ ............................................. G01B 11/26
[52] U.S. Cl. ............................................. 250/347; 250/353
[58] Field of Search ............................. 250/347, 351, 250/342, 353; 356/3, 139.01; 244/171

[56] References Cited

U.S. PATENT DOCUMENTS

| | | | |
|---|---|---|---|
| 4,792,684 | 12/1988 | Savoca | 250/347 |
| 5,311,022 | 5/1994 | Savoca | 250/347 |
| 5,646,723 | 7/1997 | Fallon | 250/339.02 |

*Primary Examiner*—Michael J. Tokar
*Assistant Examiner*—Richard Hanig
*Attorney, Agent, or Firm*—Harris Beach & Wilcox LLP

[57] ABSTRACT

An earth horizon sensor on board an orbiting spacecraft is designed to produce four (4) scans across the earth at geosynchronous altitudes using only two non-visible wavelength (infrared) detectors. The four scans are essentially parallel and permit the earth center to be offset from the null axis of the earth sensor permitting the offset pointing of high gain communication. By providing four scans using only two detectors, components are minimized and reliability is improved. The four scans are generated with only two detectors by using both the front and rear surfaces of a rotating scanning mirror.

20 Claims, 3 Drawing Sheets

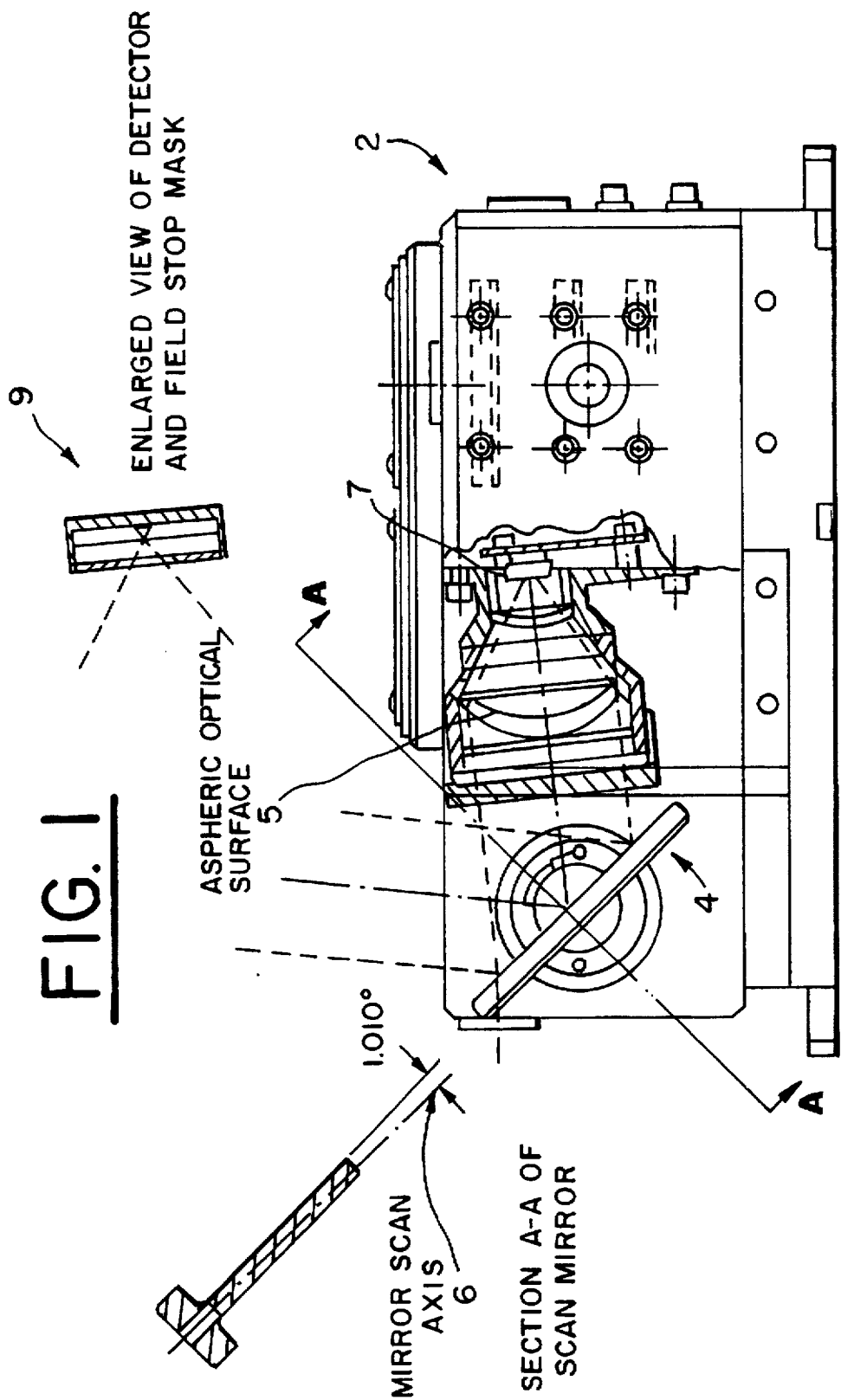

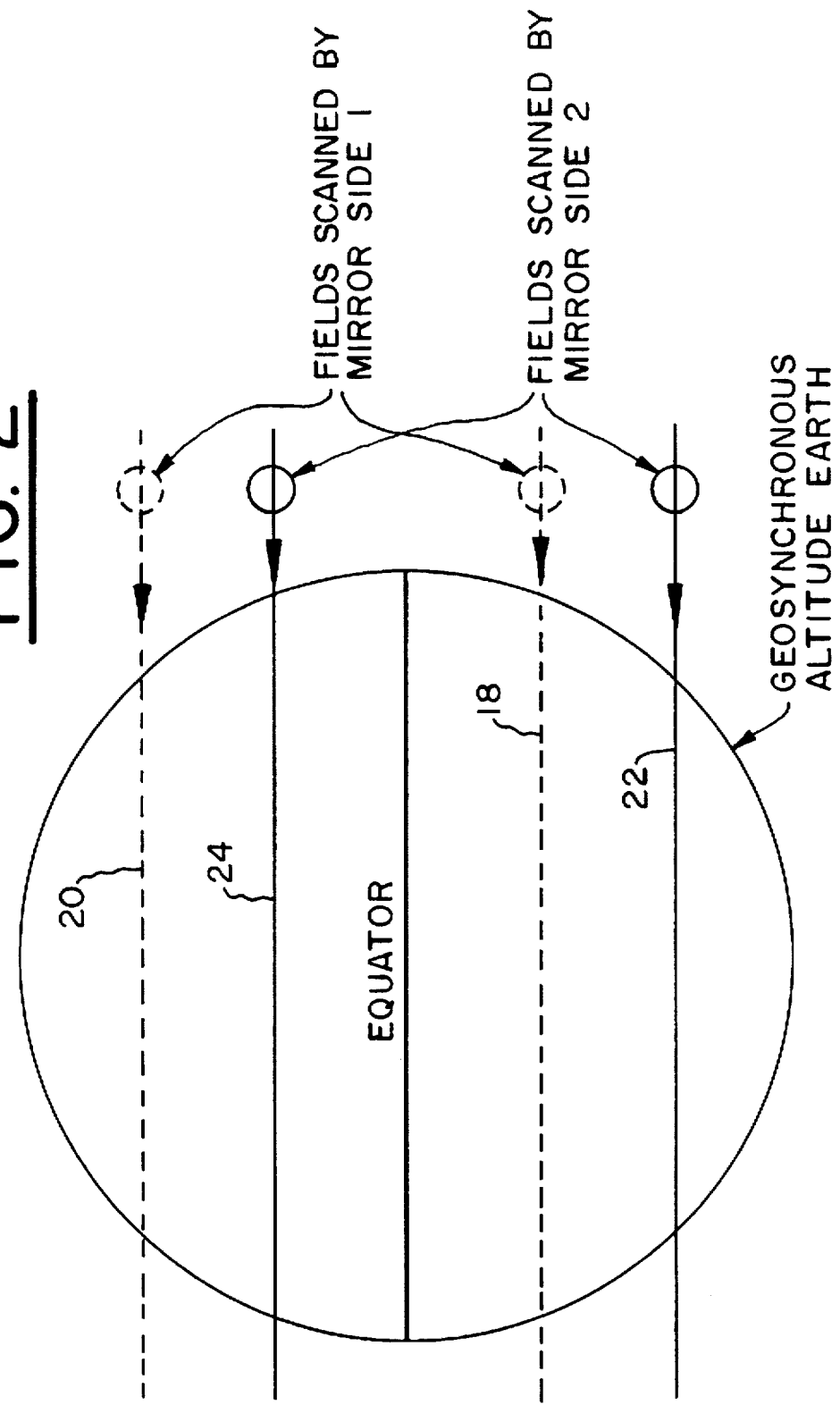

SCANNING EARTH HORIZON SENSOR

BACKGROUND OF THE INVENTION

The present invention is directed to a sensor for indicating the orientation of a satellite on which the sensor is mounted, and more particularly to an earth horizon sensor. Sensors of the type in accordance with the present invention are generally carried on board satellites, space probes and the like for sensing the horizon of the earth, and for producing a signal indicating orientation of the satellite with respect to the earth around which the satellite is orbiting. The sensors are provided for attitude control and guidance of satellites. The attitude of the satellite is determined by its position with respect to three axis at right angles to each other. Typically, two of these axis are in a plane at right angles to a projected radius of the earth passing through the satellite and are defined as pitch and roll, and the third axis coincides with a radius defined as yaw.

A particularly useful improved earth horizon sensor is disclosed in U.S. patent application Ser. No. 08/404,181, filed Mar. 13, 1995, entitled "Combined Earth Sensor" now U.S. Pat. No. 5,646,723, which is commonly owned with the present application. The disclosure of said application Ser. No. 08/404,181 is hereby expressly incorporated by reference into the present application.

The known and conventional earth horizon sensors which have been used in the past for attitude stabilization of a spacecraft operate by locating the center of the earth from a satellite in space by either facing opposite horizons and comparing the infrared irradiances of these opposite horizons, or by scanning across these horizons and bisecting the measured angles in the scan to locate the earth's center. One disadvantage of these earth horizon sensors is that they require four (4) detector channels to produce four scans, thereby increasing the number of components and costs thereof, and decreasing the reliability of the overall scanning procedure.

It is the primary object of the present invention to provide an earth horizon sensor capable of generating four scans using only two detectors, thereby advantageously reducing the number of components and costs, and improving the reliability of the scanning procedure. Other objects and advantages of the present invention will become apparent to those skilled in the art from the following description.

SUMMARY OF THE INVENTION

An earth horizon sensor has the capability of generating four scans using only two infrared detectors thereby reducing the number of components and costs, and improving the reliability of the scanning procedure, as compared to scanning procedures conducted in a conventional manner using four detector channels. The four essentially parallel scans provided by the present invention advantageously permit the center of the earth to be offset from the null axis of the earth horizon sensor, thereby advantageously permitting the offset pointing of high gain communication or television antennas to specific points on the earth's surface. The use of four earth scans is made in a manner such that even at extreme elevation offset, at least two of the four scans can be used to determine the earth center offset more accurately than known scanning procedures employing sensors having only two parallel scans. The use of four scans also permits operation of the sensor with negligible degradation when either the sun or moon intrudes into one of the scans.

The four scans are generated by use of only two infrared detectors in accordance with the present invention be employing both the front and rear surfaces of a rotatable "paddle wheel" type flat scanning mirror. One of the surfaces of the mirror is slightly tilted in a plane parallel to the mirror scan axis, and this tilt separates the center of the elevation angle of the two scans generated by each surface of the mirror. Accordingly, two scans are generated by the front surface of the scan mirror, and two further scans displaced in elevation from the first two scans, are generated by the rear surface of the mirror.

BRIEF DESCRIPTION OF THE DRAWINGS

FIG. 1 of the drawing schematically illustrates an earth horizon sensor capable of providing four scans using only two detector channels, in accordance with the present invention;

FIG. 2 schematically illustrates a scan pattern of the earth resulting from the device illustrated by FIG. 1 in which the elevation of the first two scans is displaced from that of two further scans.

DESCRIPTION OF THE BEST MODES FOR CARRYING OUT THE INVENTION

Figure 3A:
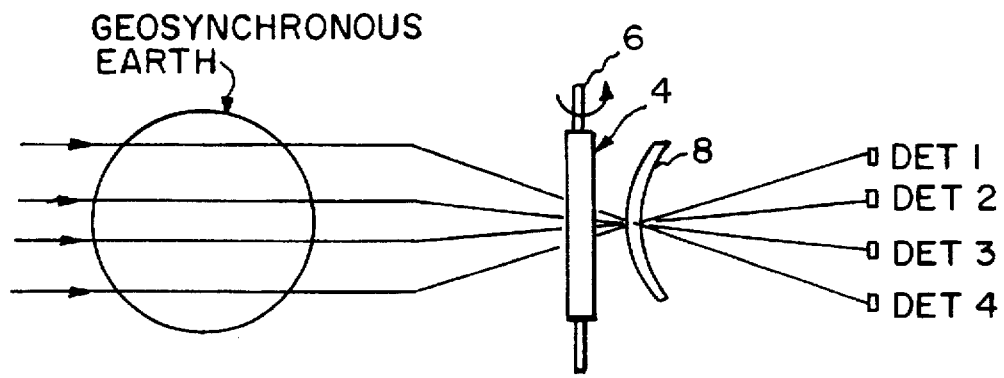
FIG. 3A schematically illustrates four scans provided by a prior art four channel detector, and FIG. 3B schematically illustrates four scans of the earth provided by two detector channels in accordance with the present invention.

FIG. 1 of the drawing illustrates an earth horizon sensor in accordance with the present invention. The earth horizon sensor is designed to produce four scans using only two scan channels. Accordingly, the device eliminates the use of four detector channels that are normally required by known earth horizon sensors to produce four scans. A device in accordance with the present invention minimizes the number of components and costs in a scanning procedure, and improves the reliability of the scanning procedure as a result of the elimination of the two detector channels.

The earth horizon sensor in accordance with the present invention represents an improvement over known earth sensors, particularly those designed for operation in orbit at the earth's geosynchronous altitude, at which a spacecraft operating in these orbits parallel to the earth's equator stays stationary relative to the earth's surface, and thus is useful for communication and/or geologic earth and weather mapping purposes. The earth horizon sensor in accordance with the present invention is capable of producing four scans across the earth at geosynchronous altitude, as illustrated by FIG. 2, where the earth subtends an angle of 17.45°. The four scans are essentially parallel to the Equator. The earth horizon sensor in accordance with the present invention produces these scans using only two (infrared) detectors, as compared to conventional sensors which require four detector channels.

The four essentially parallel scans provided by the present invention advantageously allow the center of the earth to be offset from the null axis of the earth sensor, which for certain spacecraft missions, represents a desirable feature because it allows the offset pointing of high gain communication or television antennas to specific points on the earth's surface which would not be possible if the earth horizon sensor determined only the earth center. Moreover, because the scans in accordance with the present invention are closely parallel to the earth's equator, sensor errors resulting from seasonal earth radiance (infrared emitted brightness) variations, which can change significantly even in the atmospheric carbon dioxide absorption wavelength region between wavelengths of between 14 and 16 microns, in which most earth sensors operate, are minimized.

By using four earth scans, the geosynchronous earth is allowed to move ±8° in a North—South direction relative to the null axis of the sensor, without the scans leaving the earth. Even at this extreme elevational offset, at least two of the four scans are usable to determine the earth center offset more accurately than can be determined using known sensors having only two parallel scans. The use of four scans also permits operation of the earth horizon sensor with negligible error degradation when either the sun or moon enters into one of the scans. Depending upon the season, the intrusion of the sun and/or moon into a scan will regularly occur once each twenty-four hour orbit.

The generation of four scans using only two infrared detectors is accomplished by using both the front and rear scanning surfaces of a rotatable "paddle wheel" type flat scanning mirror as illustrated in FIG. 1. Reference numeral 2 generally designates the earth horizon sensor in accordance with the present invention, and reference numeral 4 generally designates the rotatable scanning mirror. The mirror scan axis is designated by reference numeral 6. As illustrated in FIG. 1, one of the surfaces of the mirror 4 is slightly tilted relative to the plane of the mirror scan axis 6. This tilt separates the center of the elevation angle of the two scans generated by each surface of the mirror 4 (i.e. the front and rear surfaces of the mirror) to produce a scan pattern as shown in FIG. 2. In this manner, two scans are generated by a first surface of the mirror (e.g., the front surface), and two further scans displaced in elevation from the first two scans, are generated by a second surface of the mirror (e.g., the rear surface). If, for example, the mirror 4 illustrated in FIG. 1 is rotated at a speed of two rotations per second, a total of four scans are generated each 0.5 seconds. Since two scans can provide two axis locations of the earth's center, its location can be updated four times a second, thereby advantageously improving the operation of the spacecraft's attitude control system.

Figure 3B:
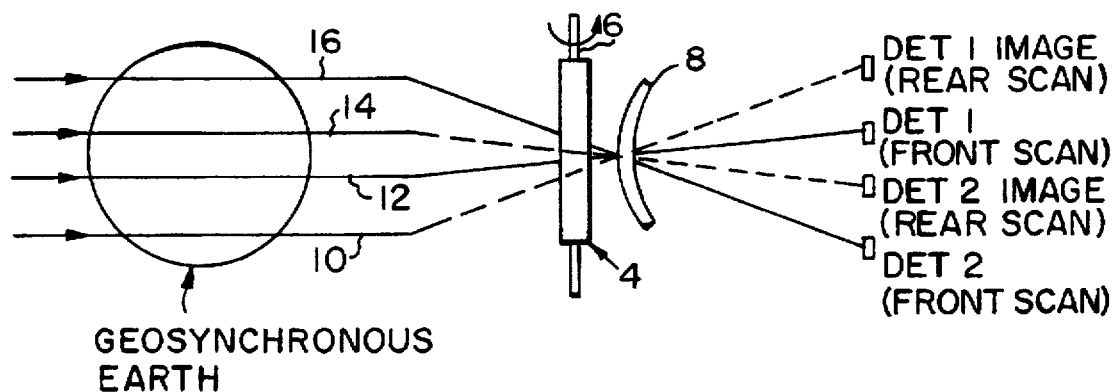

FIG. 3A and 3B illustrate a schematic comparison between four scans of the earth provided by four detector channels as known to the prior art, and four scans of the earth provided by two detector channels in accordance with the present invention by which two scans are generated by the front surface of a rotatable scanning mirror, and two scans are generated by the rear surface of a rotatable scanning mirror. The rotatable scanning mirror is designated by reference numeral 4 in FIGS. 3A and 3B, and the axis of rotation is designated by reference numeral 6 in FIGS. 3A and 3B. In FIG. 3A, four scans are provided by four detector channels from the mirror 4 through a lens 8. In FIG. 3B, four scans are provided by two detector channels from the scanning mirror 4 through a lens 8 disposed between the scanning mirror and the two detectors. A first scan 10 is provided at a first detector channel from the rear surface of the scan mirror 4; a second scan 12 is provided at the first detector channel by the front surface of the scan mirror 4; a third scan 14 is provided at a second detector channel by the rear surface of the scan mirror 4; and a fourth scan 16 is provided at the second detector channel by the front surface of the scan mirror 4. The four scans 10, 12, 14, and 16 are essentially parallel to each other (and to the Equator) and pass through the geosynchronous earth. Accordingly, four scans are generated using only two infrared detector channels in conjunction with use of the front and rear surface of a rotatable flat scanning mirror.

FIG. 2 is similar to FIG. 3B and illustrates four parallel scans, two of which are scanned by a first surface of a rotatable mirror, and two of which are scanned by a reverse surface of a rotatable mirror. The scan pattern illustrated by FIG. 2 shows four scans which are orientated essentially parallel to the geosynchronous earth's equator. As also illustrated by FIG. 2, the two scans 18 and 20 generated by a first surface of the scan mirror are offset from the equator, and the two scans 22 and 24 generated by the opposed surface of the scan mirror are likewise offset from the equator. As previously discussed, the offset elevation of the scans from the different surfaces of the mirror are a result of the tilt of the orientation of one surface relative to the axis of the mirror. However, the four scan channels resulting from the two scans by each surface of the scan mirror result in four parallel scans 18, 20, 22 and 24 which are equidistantly spaced from both sides of the geosynchronous earth's equator.

Referring back to FIG. 1 of the drawing, reference numeral 5 illustrates a lens having an aspheric optical surface, and reference numeral 7 generally designates one of the two infrared detectors employed in accordance with the present invention. The lens 5 is disposed between the rotatable mirror 4 and the infrared detector 7 such that the two scans generated by the first surface of the rotatable mirror and the two scans generated by the second surface of the rotatable mirror are transmitted through the optical element 5 to the two infrared detectors disposed behind the optical element. As discussed above, the use of two surfaces of the rotatable flat scanning mirror to generate four scans enables the earth horizon sensor 2 to operate using only two infrared detectors.

In the preferred embodiment of the earth horizon sensor in accordance with the present invention, the detector is an infrared detector operating in the 14–16 micron wavelength region. Such detectors include pyroelectric detectors, thermistor bolometers, high speed thermopiles or thermocouples, and long wavelength photon detectors (which may require cooling).

The optical system used in the earth horizon sensor in accordance with the preferred embodiments of the present invention must provide sufficiently high optical speed to achieve sharp edges for the fields of view defined by the infrared detectors. This is accomplished by the use of lenses fabricated from germanium and zinc selenide, both of which have good optical transmittance in the 14–16 micron wavelength region. In order to achieve the required high optical speed (typically f/nos less than 1.0), aspheric surfaces are required on one or two optical surfaces of the optical system. These aspheric surfaces (usually conic sections) as illustrated by reference numeral 5 in FIG. 1 of the drawing, can be achieved with diamond turning techniques, in which a sharp diamond tool in an extremely high precision computer controlled lathe, machines the germanium or zinc selenide material to achieve the required non-spherical shape, which provides the desired correction of the optical aberrations.

If pyroelectric detectors are used in the earth sensor, a further consideration must be addressed. In pyroelectric detectors, which are capacitors, there is a limitation on the minimum area of detection. In order to achieve a desired radiometric sensitivity, the capacitance of the detector cell must be large relative to the stray capacitance of its associated electronic components and wiring. This imposes a practical limitation that the minimum diameter of pyroelectric detector cells be approximately 1.0 millimeters. In order to achieve the desired accuracy of earth horizon sensors, it is desirable to limit the diameter of the scanned field to 1° or less. With a typical 35 millimeter diameter optical aperture used in earth horizon sensors, the field stop diameter to achieve a 1° diameter field would be only 0.5 millimeters. Since a 0.5 millimeter diameter pyroelectric detector would not provide the desired sensitivity as a result of the considerations discussed above, a 0.5 millimeter diameter mask is positioned in front of the detector cell to define the field stop and allow energy being transmitted through the field stop to diverge on the 1.0 millimeter diameter detector cell. Reference numeral 9 of FIG. 1 illustrates an enlarged view of a detector and field stop mask for use in the earth horizon sensor 2 when pyroelectric detectors are employed as the infrared detectors.

Other advantages within the scope of the present invention will become apparent to those skilled in the art. Accordingly, the above discussion of the preferred embodiments is intended to be illustrative only, but not restrictive of the scope of the invention, that scope being defined by the following claims and all equivalents thereto.

We claim:

1. An earth horizon sensor for spacecraft orbiting the earth, said sensor comprising:

a housing;

a scanning mirror having a first scanning surface and a second scanning surface, said scanning mirror being rotatably mounted within said housing; and two infrared detectors operatively associated with said scanning mirror;

wherein said sensor provides four scans of the earth using only said two infrared detectors, two of said scans being generated by said first scanning surface of said mirror, and two of said scans being generated by said second scanning surface of said mirror.

2. The sensor as claimed in claim 1 wherein said scanning mirror defines a mirror scan axis, and one of said first and second surfaces of said mirror is oriented in a plane tilted relative to the mirror scan axis, wherein the center of the elevation angle of each of the two scans generated by said first and second mirror surfaces, respectively, are separated from each other, and said two scans generated by said first and second mirror surfaces are displaced in elevation relative to each other.

3. The sensor as claimed in claim 1 further including an optical element disposed in said housing between said scanning mirror and said two infrared detectors.

4. The sensor as claimed in claim 3 wherein said optical element is a lens providing optical transmittance in the 14–16 micron wavelength region.

5. The sensor as claimed in claim 4 wherein said lens is formed from germanium.

6. The sensor as claimed in claim 4 wherein said lens is formed from zinc selenide.

7. The sensor as claimed in claim 3 wherein said optical element is a lens having at least one aspheric surface.

8. The sensor as claimed in claim 2 wherein said four scans generated by said scanning mirror and said two infrared detectors are essentially parallel to each other and to the equator of the earth.

9. The sensor as claimed in claim 1 wherein said two infrared detectors operate in the 14–16 micron wavelength region.

10. The sensor as claimed in claim 1 wherein said two infrared detectors are pyroelectric detectors.

11. The sensor as claimed in claim 1 wherein said two infrared detectors are thermistor bolometers.

12. The sensor as claimed in claim 1 wherein said two infrared detectors are thermopiles or thermocouples.

13. The sensor as claimed in claim 1 wherein said two infrared detectors are photon detectors.

14. An earth horizon sensor for a spacecraft orbiting the earth, said sensor comprising:

a housing;

a scanning mirror having a first scanning surface and a second scanning surface, said scanning mirror being rotatably mounted within said housing;

two infrared detectors operatively associated with said scanning mirror for generating four scans, two of said scans being generated by said first scanning surface of said scanning mirror, and two of said scans being generated by said second scanning surface of said scanning mirror;

an optical element disposed between said scanning mirror and said two infrared detectors;

said two infrared detectors comprising pyroelectric detectors; and a field stop mask disposed forward of said pyroelectric detectors.

15. The sensor as claimed in claim 14 wherein said field stop mask has a diameter of substantially 0.5 millimeters to permit energy passing through said field stop to diverge on a pyroelectric detector having a diameter of substantially 1.0 millimeters, wherein the diameter of the scanned field of view by said sensor is 1° or less.

16. A method of scanning the earth with an earth horizon sensor aboard a spacecraft orbiting the earth, said method comprising the steps of:

rotating a rotatable scanning mirror having a first scanning surface and a second scanning surface for generating four scans, two of said scans generated by said first scanning surface of said mirror, and two of said scans generated by said second scanning surface of said mirror; and transmitting scanned energy onto two infrared detectors operatively associated with said rotatable scanning mirror;

wherein four scans are generated using only two infrared detectors.

17. The method as claimed in claim 16 further including the step of:

tilting one of said first and second scanning surfaces of said scanning mirror relative to a scan axis of said scanning mirror for separating the center of the elevation of the angle of the two scans generated by said first scanning surface and the two scans generated by said second scanning surface, wherein said two scans generated by said first scanning surface are displaced in elevation from said two scans generated by said second scanning surface.

18. The method as claimed in claim 16 further including the steps of:

generating said four scans essentially parallel to each other and essentially parallel to the earth's equator.

19. The method as claimed in claim 16 further including the step of:

transmitting said four scans generated by said rotating scanning mirror through an optical element disposed between said scanning mirror and said two infrared detector elements.

20. The method as claimed in claim 16 further including the step of rotating said scanning mirror at substantially two rotations per second, wherein said four scans are generated in 0.5 seconds.

* * * * *